N. WINSZE & M. PLOCHER.
SANITARY CUSPIDOR.
APPLICATION FILED JAN. 15, 1912.

1,027,785.

Patented May 28, 1912.
2 SHEETS—SHEET 1.

WITNESSES:
Harry A. Beinné
A. M. Powell

INVENTORS.
Nedin Winsze
Martin Plocher.
BY
Ernst Staren
ATTORNEY.

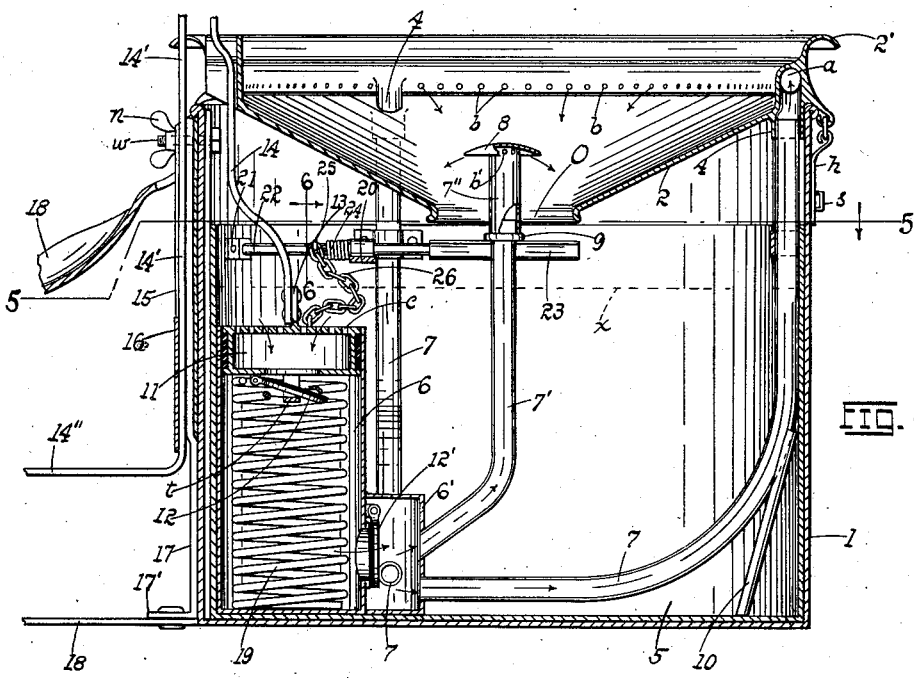
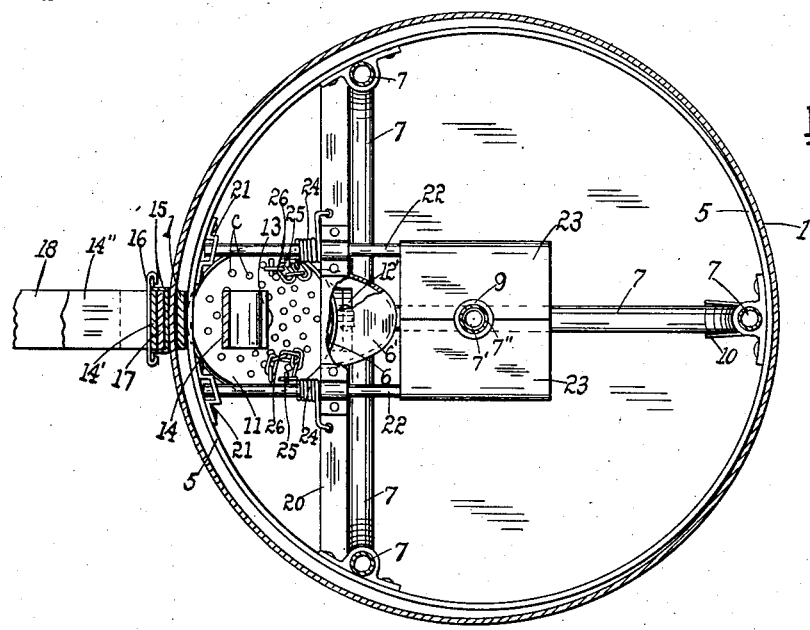
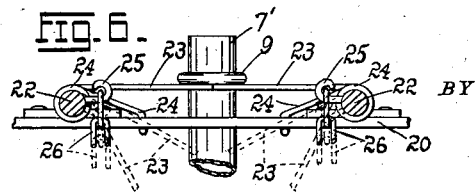

UNITED STATES PATENT OFFICE.

NEDIN WINSZE AND MARTIN PLOCHER, OF ST. LOUIS, MISSOURI.

SANITARY CUSPIDOR.

1,027,785.  Specification of Letters Patent.  Patented May 28, 1912.

Application filed January 15, 1912. Serial No. 671,377.

*To all whom it may concern:*

Be it known that we, NEDIN WINSZE and MARTIN PLOCHER, respectively a subject of the King of Hungary and a citizen of the United States, residing at St. Louis, State of Missouri, have invented certain new and useful Improvements in Sanitary Cuspidors, of which the following is a full, clear, and exact description, reference being had to the accompanying drawings, forming a part hereof.

Our invention has relation to improvements in sanitary cuspidors; and it consists in the novel details of construction more fully set forth in the specification and pointed out in the claims.

Figure 1:
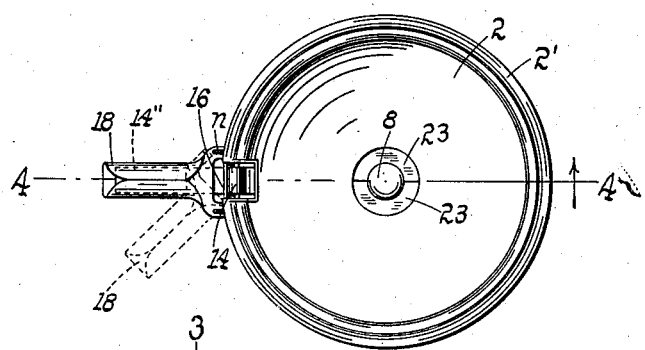
Figure 2:
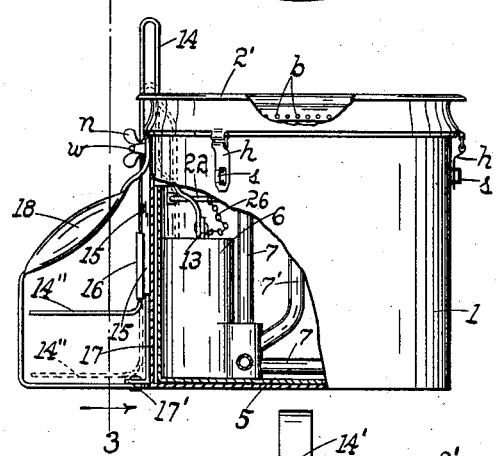
Figure 3:
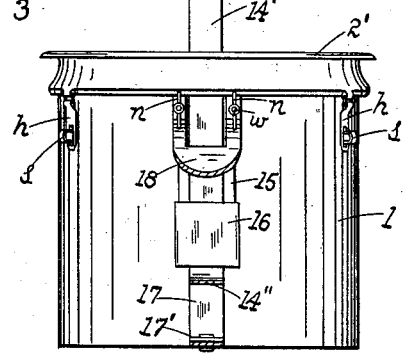

In the drawings, Figure 1 is a top plan of the cuspidor; Fig. 2 is a side elevation with parts broken away; Fig. 3 is a vertical front section on the line 3—3 of Fig. 2; Fig. 4 is a middle vertical section on a larger scale on the line 4—4 of Fig. 1; Fig. 5 is a horizontal section on the line 5—5 of Fig. 4; and Fig. 6 is a sectional detail on the vertical line 6—6 of Fig. 4.

The object of our invention is to construct a cuspidor the top of which may be periodically flushed so as to present a neat appearance, all dirt and disease germs being washed into the interior of the spittoon, the flush water being preferably provided with an admixture of a suitable disinfectant or germicide of any available character (such as carbolic acid) known to the art, or plain water may be employed if so desired.

The advantages of the invention will be better apparent from a detailed description thereof which is as follows:—

Referring to the drawings, 1 represents an outer vessel or casing provided with a removable funnel-shaped or conical hood or cover 2, having a bottom discharge opening *o*, the upper edge of the cover being provided with a flange 2' projecting beyond the vessel 1, and serving as a means of seizing the cover when occasion arises to remove it from the vessel. At the base of the flange 2' and formed with the cover is an annular passage *a* (which may take the form of a circular pipe or tube) the walls of which are provided with perforations *b* discharging over the upper surface of the cover, a series of short tubes or hollow nipples 4 depending from the passage-way *a* just inside the walls of the vessel 1. Deposited in the vessel 1 is a liquid container or receptacle 5 at one side of which is located a pump-cylinder 6 open at the top, the base of the cylinder having a lateral extension or chamber 6' as shown. From the walls of this chamber lead a series of tubes or pipes 7, 7, 7, whose upper ends couple into the nipples 4 when the cover 2 is deposited in position, a similar pipe or tube 7' extending centrally through the cuspidor and through the opening *o* of the cover to a point above the opening, said tube 7' terminating in a removable extension 7" which is provided with a circular cap or deflector 8 beneath which the tube 7" is provided with a series of spray openings *b'*. A collar 9 is formed on the tube 7' just below the cover 2. The tubes 7 are preferably braced by braces 10 as shown.

Within the cylinder 6 operates a hollow piston or plunger 11 the bottom wall of which is provided with the usual form of hinge check-valve 12 (limited outwardly by a U-shaped yoke *t*) the top wall of the piston being provided with perforations or openings *c* to serve as a strainer. At the entrance to the chamber 6' is a check-valve 12' opening toward the chamber. The parts described (6, 11, 12, 12', 6') constitute an ordinary form of pump well understood in the art and need not be dwelt on at length herein. To a central lug 13 of the perforated top wall of the piston 11 is secured the lower end of the inner bent leg 14 of the piston-rod, the outer leg 14' lying close to the outer wall of the vessel 1 along which it is supported in a suitable bearing (presently to be described) the free end of the leg 14' terminating in an outwardly deflected pedal member 14" as shown.

The guide-bearing for the leg 14' may be described as follows:—Disposed on the outside of the wall of the vessel 1 are a pair of angle-pieces or ribs 15, 15, the outer legs of which receive a slide or plate 16, the side edges of the latter being folded over said legs so as to form a tongue-and-groove connection therewith (Fig. 5). This leaves an open space between the plate 16 and wall of the vessel, a part of which space is taken up by a strap-plate 17 riveted to the vessel 1, the lower end of the strap being bent into a lug 17' for a purpose presently to be described. The remainder of the space, or that between the strap 17 and plate 16 is taken up by the leg 14' of the plunger-rod or piston-rod the said rod being free to play up and down in the bearing or support thus improvised therefor. To the lug 17' is swiveled (or movably riveted) the lower free end of the cuspidor handle 18, the upper end of the said handle being forked to straddle the pieces 15, 15, the fork members being finally and detachably secured to the wall of the vessel 1 by means of wing-nuts n, n, passed over the bolts w. To insert the leg 14' between the angle-pieces 15, 15, the nuts n, n, are unscrewed thus releasing the handle 18, whereupon the latter may be swung to one side about its swivel connection with the lug 17' (see dotted position Fig. 1). The leg 14' being in place (between the ribs 15, 15) the slide 16 is passed over the said ribs thus completing the bearing for the piston-rod leg. After this the handle 18 is swung back to position, the bolts w reinserted and the nuts n, n, passed over the bolts and the operation is complete. In like manner may the member 14 be removed when occasion therefor arises. When the parts are assembled, the pedal 14'' lies in the plane of the handle 18. Interposed between the piston 11 and the bottom of the cylinder 6 is a compression spring 19 which tends to maintain the piston at the top of the cylinder.

Mounted in suitable bearings on a cross-bar 20 spanning the container 5, and having their ends supported by bearings 21, 21, on the wall of the container, are a pair of parallel rock-shafts 22, 22, spaced a suitable distance apart, the inner ends of the shafts carrying wings or gates 23, 23, which are adapted to close against the tube 7' and bear against the under side of the collar 9. The shafts are rocked, and the wings are oscillated to their closed position against the collar 9, under the torsional action of suitable coiled springs 24 encompassing the respective shafts, one end of the spring being connected to the cross-bar 20 and the opposite end to the rock-shaft (as quite obvious). Adjacent the spring each shaft 22 is provided with a pin or eye-bolt 25 to which is secured one end of a cable, or chain 26, the opposite end of the chain being connected to the plunger or piston 11.

The lengths of the chains 26 are such that after the plunger has made a partial downward stroke, it pulls on the chains, rocks the shafts 22 in proper direction, and swings the gates or wings 23 to open position (Fig. 6) for a purpose better apparent from a description of the operation of the device which is as follows:—Assuming that the receptacle 5 is filled with water to a level above the top of the cylinder 6 (a level indicated by the dotted line x, Fig. 4) and that it is desired to flush the surface of the cover or lid 2 on which objectionable spittle and other matter (liquid and solid) has accumulated, the attendant places his foot on the pedal 14'' and depresses the same in which action the piston is forced downward against the tension of the spring 19, the water (which has entered the cylinder through the perforations c of the hollow piston and past the valve 12) being forced through the several tubes 7 into the passage a whence it is projected in jets through the perforations b, washing the dirt toward the central opening o. At the same time the water is forced up through the central tube 7' whence it is projected through the perforations b' under the cap or hood 8, the latter deflecting the streams against the cover 2 in a measure counter to the water flowing down the incline of the cover, producing eddies which effectively flush and wash the surface of the cover, the material flowing toward the opening o. As the piston descends it rocks the shafts 22, thus opening the gates or wings 23 (Fig. 6), allowing the whole to discharge into the receptacle 5. When the pedal 14'' is released, the spring 19 restores the piston to its normal position, and the gates 23 return to their closed position under the action of the springs 24. The perforated piston acts as a strainer preventing solid particles from entering the cylinder and interfering with the action of the pump valves. It will be seen that the piston may thus be periodically operated and the cover 2 flushed from time to time. The closed gates 23 conceal the dirty contents of the receptacle 5, and thus the cuspidor always presents a neat appearance. When the contents of the receptacle 5 becomes too dirty and too thick for effective flushing, the hood 2 is removed, the receptacle taken out of the vessel 1 and washed, after which the parts are restored, a fresh charge of water introduced, and the operation may be repeated as often as desired.

Structural details illustrated in the drawings, but not alluded to are within the skill of the mechanic and require no description in the present connection. The cover 2 may be clamped to the vessel 1 by means of hinged straps h passed over staples s, or in any other mechanical manner.

Having described our invention, what we claim is:

1. In a cuspidor, an outer vessel, an inner liquid container, a piston-pump in the container, a bent poston-rod leading from the piston and having one leg disposed and guided on the outside of the outer vessel, a pedal on the free end of the outer piston-rod leg, a conical cover having a central discharge opening above the container, spring-controlled gates normally closing across said opening, and intermediate connections between the piston and gates for opening said gates by a movement of the piston in one direction.

2. In a cuspidor, an outer vessel or casing, a liquid container in the same, a conical hood or cover having a central opening above the container, an outer marginal perforated spray pipe or passage-way, a pump having a cylinder opening into the container, a spring-controlled reciprocating piston in said pump, a pedal extending from the piston on the outside of the casing, pipes leading from the cylinder from points below the piston and connecting with the marginal spray pipe, a pipe leading from the cylinder through and above the central opening of the cover and terminating in a deflector cap, the pipe being perforated below the cap, a pair of oscillating-spring-controlled gates closing against the last mentioned pipe, rock-shafts for said gates, suitable connections between the gates and piston, and a strainer on the piston for excluding solid matter from the cylinder, the parts operating substantially as set forth.

3. In a cuspidor, an outer vessel, an inner liquid container, a piston pump in the container, a bent piston-rod leading from the piston and having one leg disposed on the outside of the outer vessel, guide-ribs for the said leg, a slide coupled to the ribs, a pedal member on the free end of the piston-rod leg, a handle having a bottom swivel connection carried by the outer vessel, an upper terminal fork on the handle straddling the slide, and means for securing the fork members to the outer vessel for the purpose set forth.

In testimony whereof we affix our signatures, in presence of two witnesses.

NEDIN WINSZE.
MARTIN PLOCHER.

Witnesses:
EMIL STAREK,
A. W. POWELL.

---

Copies of this patent may be obtained for five cents each, by addressing the "Commissioner of Patents, Washington, D. C."